(12) United States Patent
Oruc et al.

(10) Patent No.: US 12,512,485 B2
(45) Date of Patent: Dec. 30, 2025

(54) SEPARATOR PLATE WITH A BEAD PASSAGE

(71) Applicant: Reinz-Dichtungs-GmbH, Neu-Ulm (DE)

(72) Inventors: Ahmet Oruc, Neu-Ulm (DE); Rainer Glueck, Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 470 days.

(21) Appl. No.: 18/055,287

(22) Filed: Nov. 14, 2022

(65) Prior Publication Data
US 2023/0155142 A1      May 18, 2023

(30) Foreign Application Priority Data
Nov. 15, 2021   (DE) .................. 20 2021 106 233.9

(51) Int. Cl.
*H01M 8/0247* (2016.01)
*H01M 8/0271* (2016.01)

(52) U.S. Cl.
CPC ....... *H01M 8/0247* (2013.01); *H01M 8/0271* (2013.01)

(58) Field of Classification Search
CPC ............. H01M 8/0247; H01M 8/0271; H01M 8/0276; H01M 8/0297; H01M 8/2483; H01M 8/0206; H01M 8/0258; H01M 8/0202; H01M 8/0273; H01M 8/04029; Y02E 60/50
See application file for complete search history.

(56) References Cited

FOREIGN PATENT DOCUMENTS

| CN | 110311150 | * 10/2019 | .......... H01M 8/0276 |
|---|---|---|---|
| CN | 110311150 A | * 10/2019 | .......... H01M 8/0276 |
| DE | 10248531 A1 | 4/2004 | |

\* cited by examiner

*Primary Examiner* — Helen Oi K Conley
(74) *Attorney, Agent, or Firm* — McCoy Russell LLP (57) ABSTRACT

The present disclosure relates to a separator plate for an electrochemical system. The electrochemical system may be, for example, a fuel cell system, an electrochemical compressor, or an electrolyzer.

12 Claims, 8 Drawing Sheets

SEPARATOR PLATE WITH A BEAD PASSAGE

CROSS-REFERENCE TO RELATED APPLICATION

The present application claims priority to German Utility Model Application No. 20 2021 106 233.9, entitled "SEPARATOR PLATE WITH A BEAD PASSAGE", filed on Nov. 15, 2021. The entire contents of the above-listed application is hereby incorporated by reference for all purposes.

TECHNICAL FIELD

The present disclosure relates to a separator plate for an electrochemical system. The electrochemical system may be, for example, a fuel cell system, an electrochemical compressor, or an electrolyzer.

BACKGROUND AND SUMMARY

Known electrochemical systems usually comprise a plurality of separator plates, which are arranged in a stack so that each two adjacent separator plates enclose an electrochemical cell. An electrochemical cell usually comprises a membrane, which is provided with electrodes and with a catalyst layer, and optionally gas diffusion layers facing towards the separator plates. For example, the actual membrane is not formed over the entire surface of a separator plate, but instead extends substantially in the area that forms the electrochemically active region of the system. This is usually arranged substantially centrally and is surrounded by a frame. This frame is usually formed by an electrical insulator, for example a polymer-based film. The frame also has the task of electrically insulating adjacent separator plates from each other and thus avoiding a short-circuit. Besides the membrane, the electrodes and the catalyst layer(s), the membrane electrode assembly, hereinafter also abbreviated as MEA, also comprises the frame, which is sometimes also referred to as a reinforcing edge, but not the gas diffusion layer(s).

The separator plates usually each comprise two individual plates, which are connected to each other along their rear sides facing away from the electrochemical cells. The separator plates may serve, for example, for electrically contacting the electrodes of the individual electrochemical cells (for example fuel cells) and/or for electrically connecting adjacent cells (series connection of the cells). The separator plates can also be used to dissipate heat produced in the cells between the separator plates. Such exhaust heat can be created, for instance, when converting electrical or chemical energy, respectively, in a fuel cell. In the case of fuel cells, bipolar plates are often used as separator plates.

The separator plates or the individual plates of the separator plates each usually have at least one passage opening. In the separator plate stack of the electrochemical system, the through-openings of the stacked separator plates, which through-openings are arranged in an aligned or at least partially overlapping manner, then form media channels for supplying or discharging media. The through-openings are accordingly also formed in the frame of the membrane electrode assembly. The through-openings in the frame may be formed with a smaller diameter than in the separator plates so that the resulting overhang of the frame insulates the adjacent separator plates from each other. In order to seal off the through-openings or the media channels formed by the through-openings of the separator plates, known separator plates also have bead arrangements, which are arranged in each case around the through-opening of the separator plate.

The individual plates of the separator plate may additionally have channel structure s for supplying one or more media to an active region of the separator plate and/or for conveying media away therefrom. The active region may for example enclose or bound an electrochemical cell. By way of example, the media may be fuels (for example hydrogen or methanol), reaction gases (for example air or oxygen) or a coolant as supplied media, and reaction products and heated coolant as discharged media. In the case of fuel cells, the reaction media, e.g. fuel and reaction gases, are usually guided on the surfaces of the individual plates that face away from each other, while the coolant is guided between the individual plates.

The flanks of the bead arrangement, which is arranged around the through-opening of the separator plate, may have one or more apertures, as shown in DE 102 48 531 A1. These apertures serve to establish a fluid connection between the through-opening of the separator plate and the active region of the separator plate. However, this solution can only be used to convey reaction gases.

It is also known from document DE 102 48 531 A1 that the separator plate may additionally have one or more conveying channels, which adjoin the bead flank on an outer side of the bead arrangement and are in fluid connection with a bead interior of the bead arrangement. The supply of a medium from the through-opening, through the bead arrangement, to the electrochemically active region of the separator plate can take place in an even more targeted manner with the aid of such conveying channels. Such embodiments of conveying channels may also improve the discharging of the medium from the electrochemically active region, through the bead arrangement, to the through-opening. Overall, therefore, the efficiency of the electrochemical system can be increased.

The aforementioned conveying channels are therefore part of a fluid connection of the through-opening to the electrochemically active region and as such are provided only in a section of the bead arrangement that extends between the through-opening and the electrochemically active region. However, this asymmetrical design of the bead arrangement may lead to inhomogeneous bead compression in the stack, which in turn may lead to leaks in the stack or system.

A separator plate having conveying channels for fluidically connecting the through-openings to the electrochemically active region is also known from the publication WO 2017/046398 A1. The separator plate has two individual plates, which are connected to each other and have aligned through-openings for the passage of a fluid. The through-openings of both individual plates each have embossed inner edges around the circumference, which are spaced apart from each other and point away or diverge from each other. The conveying channel and the embossed inner edge have an equal height, measured perpendicular to a plate plane. An inlet and/or outlet of a conveying channel, which points towards the through-opening, is also formed on the embossed inner edge of the through-opening.

These embossed inner edges are on the one hand advantageous with regard to forming the conveying channels and punching out or cutting the through-openings in one plane. On the other hand, however, the diverging inner edges pose a risk of short-circuits. When the individual plates are pushed even further apart due to the compression force of the sealing bead in the stack and the associated lever effect on the inner edge, adjacent separator plates may damage the overhang of the frame of the membrane electrode assembly, which is located therebetween, or may possibly even perforate it or cause relatively large cracks therein, and as a result in some circumstances may even make contact with each other through the resulting openings. In order to solve or alleviate this problem, the height of the sealing bead can be increased, while maintaining the height of the embossed inner edges. At the same time, however, a smallest possible height of the bead arrangement is advantageous for minimizing the size of the separator plate stack or accommodating more cells while keeping the same height of the separator plate stack. Furthermore, embodiments with increased bead height would require an adjustment of many other parameters of the overall system, for example including in the electrochemically active region, which is impossible or very difficult to implement in practice.

The object of the present disclosure is therefore to provide a separator plate for an electrochemical system that at least partially solves the problems mentioned above.

This object is achieved by embodiments of separator plates for an electrochemical system described herein. Specific embodiments are described in the description below.

Accordingly, a separator plate for an electrochemical system is proposed, comprising a first individual plate and a second individual plate, which are connected to each other. At least the first individual plate comprises:
- an electrochemically active region,
- at least one through-opening for the passage of a fluid, having an inner edge that bounds the through-opening,
- a sealing bead arranged around the through-opening for sealing off the through-opening, wherein the sealing bead has a sealing bead interior, a first bead flank facing towards the through-opening, and a second bead flank,
- a plurality of first conveying channels, which adjoin the first bead flank of the sealing bead, are in fluid connection with the sealing bead interior, extend from the sealing bead in the direction of the through-opening, and are fluidically connected to the through-opening via at least one aperture formed in the separator plate, wherein the through-opening and the sealing bead interior are fluidically connected to each other via the first conveying channels and the at least one aperture, and
- a first weld, surrounding the through-opening, for connecting the two individual plates, wherein the first weld is at a smaller distance from the inner edge than the at least one aperture and/or the first conveying channels.

As a result of the first weld, the individual plates bear against each other in the inner edge region of the separator plate, thereby preventing any diverging of the individual plates in this region of the separator plate. A risk of short-circuits and/or damage to individual components during operation of the electrochemical system can thus be reduced. The first weld may be designed, for example, as a continuous weld or a stitch weld. A stitch weld is typically characterized by a large number of weld sections spaced apart from each other in a row. According to the present disclosure, weld may also mean weld seam.

A fluid connection or a fluidic connection within the context of this specification may be a direct connection without intermediate elements or an indirect connection by way of additional intermediate elements. A fluidic connection from the through-opening, via first conveying channels, a sealing bead and optionally second conveying channels, to a distribution and/collection region or an electrochemically active region is sometimes referred to as a bead passage. A bead passage usually does not occur singly, but rather groups of bead passages are formed in the region of a sealing bead.

The at least one first aperture is usually formed in the first individual plate, but alternatively or additionally may also be formed in the second individual plate. The at least one first aperture may be designed as a cutout and/or a punched hole in the relevant plate.

The second individual plate may have the same features as the first individual plate. The separator plate may thus be constructed in a mirror-symmetrical manner at least in some regions, such as in the region of the bead passage, wherein the mirror plane extends parallel to a flat plate plane of the separator plate and between the two individual plates.

In one embodiment, the separator plate comprises a second weld for connecting the individual plates. The second weld is often arranged around the sealing bead on a side of the sealing bead remote from the through-opening. For instance, the second weld may be formed around a through-opening for a reaction gas. The second weld may be designed as a continuous weld or a stitch weld. The design of the second weld may depend on the type of through-opening. For example, if the through-opening is designed for the passage of a reaction medium, such as a reaction gas, the second weld may be designed as a continuous weld. In this case, besides the function of connecting the two individual plates, the second weld also has a sealing function and is intended to prevent cooling media and reaction media from mixing with each other. If the through-opening is designed for the passage of a coolant, such as a cooling fluid, the second weld may be designed as a stitch weld. In this case, the cooling fluid may flow between the two individual plates and through the second weld. The second weld may also advantageously be omitted in this case. Optionally, the first weld and/or the second weld are designed as laser welds, regardless of the shape of the line.

In a further embodiment, the separator plate, such as the first individual plate of the separator plate, may have a first auxiliary bead having a first auxiliary bead interior, a first bead flank facing towards the through-opening, and a second bead flank facing towards the sealing bead. In this case, the first conveying channels may adjoin the second bead flank of the first auxiliary bead, may also end at this second bead flank, and may be in fluid connection with the first auxiliary bead interior. A maximum height of the first auxiliary bead, determined perpendicular to a flat surface plane of the separator plate, may be smaller than a corresponding maximum height of the sealing bead. Often this type of auxiliary bead is not associated with a function of sealing off the through-opening. Depending on the selected height of the first auxiliary bead, when the stack is compressed in the stacking direction the first auxiliary bead may be spaced apart from the frame of a membrane electrode assembly or may bear against the frame of the membrane electrode assembly.

Usually, the first conveying channels or at least a part of the first conveying channels are arranged in such a way that they are spaced from the through-opening, e.g. their end facing the through-opening is spaced from the through-opening. If a first auxiliary bead is also present, it typically runs in such a way that a distance remains between the first auxiliary bead and the through-opening.

The at least one first aperture may be formed at least partially or entirely in the region of the first bead flank of the first auxiliary bead. In this case, the aperture is in fluid connection with the first conveying channel via the auxiliary bead interior and is therefore spaced apart from the first conveying channel by way of the auxiliary bead interior. The inlet and/or outlet of the first conveying channel therefore does not have to coincide spatially with the first aperture. Optionally, the first weld is at a smaller distance from the inner edge than the auxiliary bead.

In some embodiments, the first auxiliary bead extends all the way around the through-opening. Alternatively, the first auxiliary bead may be provided only in a region in which the first conveying channels are arranged. It may be provided that the first auxiliary bead and the inner edge of the through-opening extend at least in part parallel to each other. If the first auxiliary bead does not extend around the through-opening, the first auxiliary bead has a first end section, a middle section and a second end section. The parallelism of the first auxiliary bead and the inner edge of the through-opening may be given for the middle section of the first auxiliary bead. In its end sections, the first auxiliary bead may be oriented at an angle to the inner edge.

Optionally, the first conveying channels are oriented at an angle to the first weld and/or to the inner edge and/or to the first auxiliary bead and/or to the sealing bead, for instance at an angle of at least 60° and/or at most 120°, for instance around 90°.

The separator plate may also comprise a plurality of second conveying channels, which adjoin the second bead flank of the sealing bead and are in fluid connection with the sealing bead interior. The electrochemically active region and the sealing bead interior may be fluidically connected to each other via the second conveying channels. Each of the second conveying channels may be fluidically connected to the electrochemically active region via a second aperture formed in the separator plate, for example a second aperture formed in the first individual plate. This embodiment may be advantageous when the through-opening is designed for the passage of a reaction medium. The number of second conveying channels may be greater than or equal to the number of first conveying channels. In principle, it is also conceivable to form a smaller number of second conveying channels than first conveying channels.

The separator plate, for example the first individual plate, may additionally comprise a second auxiliary bead having a second auxiliary bead interior, a first bead flank facing towards the sealing bead, and a second bead flank facing away from the sealing bead. Usually, the second conveying channels adjoin the first bead flank of the second auxiliary bead and are in fluid connection with the second auxiliary bead interior.

A maximum height of the second auxiliary bead, determined perpendicular to a flat surface plane of the separator plate, may be smaller than a corresponding maximum height of the sealing bead. The second weld is usually arranged on a side of the second auxiliary bead remote from the sealing bead. Optionally, the second conveying channels are oriented at an angle to the second weld and/or to the second auxiliary bead and/or to the sealing bead, for example at an angle of at least 60° and/or at most 120°, for instance around 90°.

In a manner similar to the first aperture, the at least one second aperture may be formed at least partially or entirely in the region of the second bead flank of the second auxiliary bead. The at least one first aperture may be designed as a cutout and/or a punched hole in the relevant plate.

With regard to the pressure lost during the conveying of the fluid, it may be advantageous if an auxiliary bead is provided on each side of the sealing bead, e.g. if both the first auxiliary bead and the second auxiliary bead are present. Due to the associated greater degree of symmetry, a compression force on the sealing bead can be homogenized.

If a bead, e.g. the sealing bead, the first auxiliary bead and/or the second auxiliary bead, is formed not with a trough-shaped cross-section, but rather with a much more pronouncedly curved cross-section, then what has been stated above in relation to the various bead flanks generally applies to the respective outer third(s) of a bead curve.

For instance, the aforementioned heights of the auxiliary beads and of the sealing bead refer in each case to the respective bead in the non-compressed state and are given in each case by the distance of the highest point on the upper side of the respective bead top from the flat surface plane of the individual plate facing towards the bead top.

The sealing bead may have at least in part a wavy, curved, round or straight course. The bead flanks of the sealing bead are often shaped in a complementary manner, e.g. if the first bead flank is convex in one section, the second bead flank is concave in this section, and vice versa. If a wavy course is provided, the sealing bead may have alternating concave sections and convex sections, which in each case merge into each other at a turning point. The conveying channels may for example adjoin the turning points, the concave sections or the convex sections of the sealing bead. It may happen that the first conveying channels adjoin a concave section of the sealing bead, while the second conveying channels adjoin a convex section of the sealing bead, or vice versa. It is also possible that both the first conveying channels and the second conveying channels adjoin concave sections or convex sections, so that the first and second conveying channels are arranged offset relative to each other with regard to the course of the sealing bead.

The sealing bead, the inner edge, the first weld, the second weld, the first auxiliary bead and/or the second auxiliary bead may extend at least in part parallel to each other. In addition or as an alternative, the main directions of extension of the sealing bead, the inner edge, the first weld, the second weld, the first auxiliary bead and/or the second auxiliary bead may extend at least in part parallel to each other.

As indicated above, the through-opening may be designed for the passage of a reaction medium, such as a reaction gas, or a coolant, such as a cooling fluid. A through-opening may form a feed opening or a discharge opening.

Exemplary embodiments of the separator plate and of the electrochemical system are shown in the figures and will be explained in greater detail on the basis of the following description.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Here and below, features that recur in different figures are denoted by the same or similar reference signs in each case.

Figure 1:
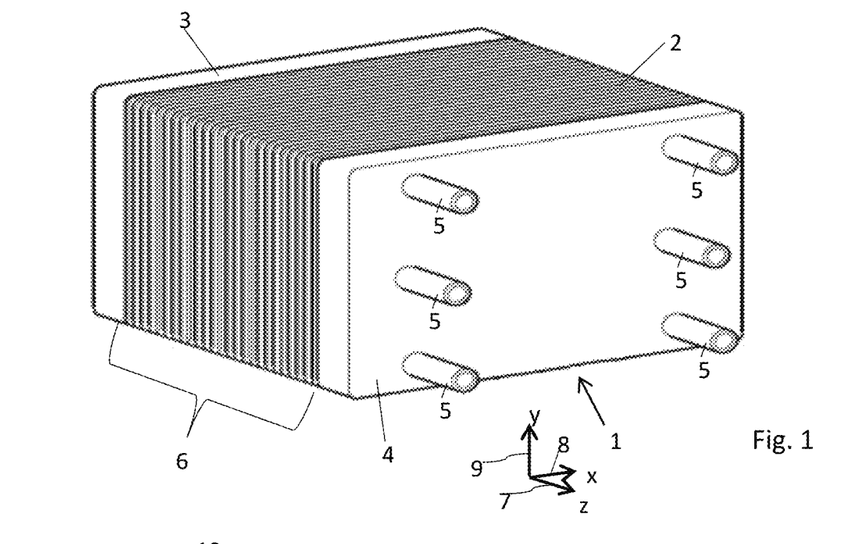
FIG. 1 schematically shows, in a perspective view, an electrochemical system comprising a plurality of separator plates or bipolar plates arranged in a stack.

FIG. 1 shows an electrochemical system 1 comprising a plurality of structurally identical metal separator plates 2, which are arranged in a stack 6 and are stacked along a z-direction 7. The separator plates 2 of the stack 6 are usually clamped between two end plates 3, 4. The z-direction 7 is also referred to as the stacking direction. In the present example, the system 1 is a fuel cell stack. Each two adjacent separator plates 2 of the stack thus bound an electrochemical cell, which serves for example to convert chemical energy into electrical energy. To form the electrochemical cells of the system 1, a membrane electrode assembly (MEA) 10 is arranged in each case between adjacent separator plates 2 of the stack (see, for example, FIG. 2). Each MEA 10 typically contains at least one membrane, for example an electrolyte membrane. Furthermore, a gas diffusion layer (GDL) may be arranged on one or both surfaces of the MEA. The MEA 10 often additionally comprises a frame-like reinforcing layer, which frames the electrolyte membrane and reinforces it. The reinforcing layer is usually electrically insulating and prevents a short-circuit from occurring during operation of the electrochemical system 1.

In alternative embodiments, the system 1 may also be designed as an electrolyzer, as an electrochemical compressor, or as a redox flow battery. Separator plates may likewise be used in these electrochemical systems. The structure of these separator plates may then correspond to the structure of the separator plates 2 explained in detail here, although the media guided on and/or through the separator plates in the case of an electrolyzer, an electrochemical compressor or a redox flow battery may differ in each case from the media used for a fuel cell system.

The z-axis 7, together with an x-axis 8 and a y-axis 9, spans a right-handed Cartesian coordinate system. The separator plates 2 each define a plate plane, each of the plate planes of the separator plates being oriented parallel to the x-y plane and thus perpendicular to the stacking direction or to the z-axis 7. The end plate 4 usually has a plurality of media ports 5, via which media can be fed to the system 1 and via which media can be discharged from the system 1. Said media that can be fed to the system 1 and discharged from the system 1 may comprise for example fuels such as molecular hydrogen or methanol, reaction gases such as air or oxygen, reaction products such as water vapor or depleted fuels, or coolants such as water and/or glycol.

Figure 2:
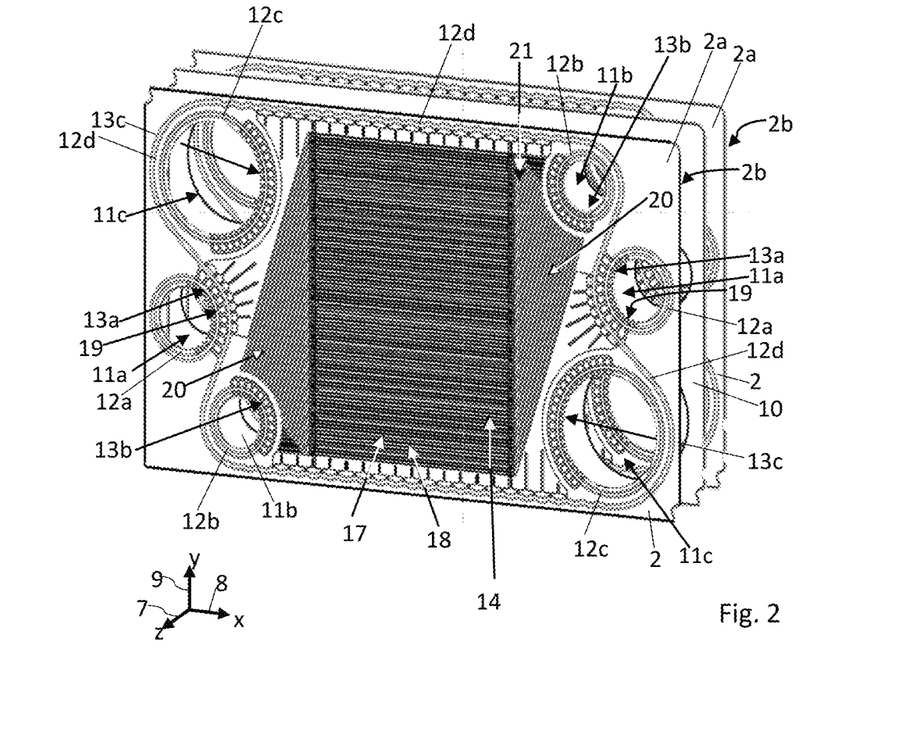
FIG. 2 schematically shows, in a perspective view, two bipolar plates of the system according to FIG. 1 with a membrane electrode assembly (MEA) arranged between the bipolar plates.

Both known separator plates, as shown in FIG. 2, and separator plates according to the present disclosure, as shown from FIG. 3 onwards, can be used in an electrochemical system as shown in FIG. 1.

FIG. 2 shows, in a perspective view, two adjacent separator plates 2, known from the prior art, of an electrochemical system of the same type as the system 1 from FIG. 1, as well as a membrane electrode assembly (MEA) 10 which is arranged between these adjacent separator plates 2 and is likewise known from the prior art, the MEA 10 in FIG. 2 being largely obscured by the separator plate 2 facing towards the viewer. The separator plate 2 is formed of two individual plates 2a, 2b which are joined together in a materially bonded manner of which only the first individual plate 2a facing towards the viewer is visible in FIG. 2, said first individual plate obscuring the second individual plate 2b. The individual plates 2a, 2b may each be manufactured from a metal sheet, for example from a stainless-steel sheet. The individual plates 2a, 2b may for example be welded to each other along their outer edge, for example by laser-welded joints.

The individual plates 2a, 2b typically have through-openings, which are aligned with one another and form through-openings 11a-c of the separator plate 2. When a plurality of separator plates of the same type as the separator plate 2 are stacked, the through-openings 11a-c form lines which extend through the stack 6 in the stacking direction 7 (see FIG. 1). Typically, each of the lines formed by the through-openings 11a-c is fluidically connected to one of the ports 5 in the end plate 4 of the system 1. For example, coolant can be introduced into the stack 6 via the lines formed by the through-openings 11a, while the coolant can be discharged from the stack via other through-openings 11a. In contrast, the lines formed by the through-openings 11b, 11c may be designed to supply fuel and reaction gas to the electrochemical cells of the fuel cell stack 6 of the system 1 and to discharge the reaction products from the stack. The media-guiding through-openings 11a-c are substantially parallel to the plate plane.

In order to seal off the through-openings 11a-c with respect to the interior of the stack 6 and with respect to the surrounding environment, the first individual plates 2a may each have sealing arrangements in the form of sealing beads 12a-c, which are in each case arranged around the through-openings 11a-c and in each case completely surround the through-openings 11a-c. On the rear side of the separator plates 2, facing away from the viewer of FIG. 2, the second individual plates 2b have corresponding sealing beads for sealing off the through-openings 11a-c (not shown).

In an electrochemically active region 18, the first individual plates 2a have, on the front side thereof facing towards the viewer of FIG. 2, a flow field 17 with first structures 14 for guiding a reaction medium along the outer side (or also front side) of the individual plate 2a. In FIG. 2, these first structures 14 are defined by a plurality of webs and by channels extending between the webs and delimited by the webs. On the front side of the separator plate 2, facing towards the viewer of FIG. 2, the first individual plates 2a additionally each have a distribution or/or collection region 20. The distribution and/or collection region 20 comprises structures 21 which are designed to distribute over the active region 18 a medium that is introduced from a first of the two through-openings 11b into the adjoining distribution region 20 and to collect or to pool, via the collection region 20, a medium flowing towards the second of the through-openings 11b from the active region 18. In FIG. 2, the distributing structures 21 of the distribution and/or collection region 20 are likewise defined by webs and by channels extending between the webs and delimited by the webs.

The sealing beads 12a-12c have conveying channels 13a-13c, of which the conveying channels 13a are formed both on the underside of the upper individual plate 2a and on the upper side of the lower individual plate 2b, while the conveying channels 13b are formed in the upper individual plate 2a and the conveying channels 13c are formed in the lower individual plate 2b. By way of example, the conveying channels 13a enable coolant to pass between the through-opening 12a and the distribution and/or collection region 20, so that the coolant enters the distribution and/or collection region 20 between the individual plates 2a, 2b and is guided out therefrom.

Furthermore, the conveying channels 13b enable hydrogen to pass between the through-opening 12b and the distribution or collection region on the upper side of the upper individual plate 2a; these conveying channels 13b adjoin apertures which face towards the distribution or collection region and which extend at an angle to the plate plane. Hydrogen, for example, thus flows through the conveying channels 13b and the apertures from the through-opening 12b to the distribution or collection region on the upper side of the upper individual plate 2a, or in the opposite direction. The conveying channels 13c enable air, for example, to pass between the through-opening 12c and the distribution or collection region, so that air enters the distribution or collection region on the underside of the lower individual plate 2b and is guided out therefrom. The associated apertures are not visible here.

The first individual plates 2a each also have a further sealing arrangement in the form of a perimeter bead 12d, which extends around the flow field 17 of the active region 18 and also around the distribution and/or collection region 20 and the through-openings 11b, 11c and seals these off with respect to the through-openings 11a, that is to say with respect to the coolant circuit, and with respect to the environment surrounding the system 1. The second individual plates 2b each comprise corresponding perimeter beads 12d. The structures of the active region 18, the distributing or collecting structures of the distribution and/or collection region 20 and the sealing beads 12a-d are each formed in one piece with the individual plates 2a and are integrally formed in the individual plates 2a, for example in an embossing, hydroforming or deep-drawing process. The same applies to the corresponding distributing structures and sealing beads of the second individual plates 2b. Each sealing bead 12a-12d may have in cross-section at least one bead top and two bead flanks, but a substantially angular arrangement between these elements is not necessary; a curved transition may also be provided, e.g. arcuate beads are also possible.

While the sealing beads 12a-12c have a substantially round course, the perimeter bead 12d has various sections that are shaped differently. For instance, the course of the perimeter bead 12d may include at least two wavy sections.

The two through-openings 11b or the lines through the plate stack of the system 1 that are formed by the through-openings 11b are in each case in fluid connection with each other via conveying channels 13b in the sealing beads 12b, via the distributing structures of the distribution or collection region 20 and via the flow field 17 in the active region 18 of the first individual plates 2a facing towards the viewer of FIG. 2. Analogously, the two through-openings 11c or the lines through the plate stack of the system 1 that are formed by the through-openings 11c are in each case in fluid connection with each other via corresponding conveying channels, via corresponding distributing structures and via a corresponding flow field on an outer side of the second individual plates 2b facing away from the viewer of FIG. 2. To this end, respective channel structures 14 for guiding the relevant media are provided in the active regions 18.

In contrast, the through-openings 11a or the lines through the plate stack of the system 1 that are formed by the through-openings 11a are in each case in fluid connection with each other via a cavity 19 which is surrounded or enclosed by the individual plates 2a, 2b. This cavity 19 serves in each case to guide a coolant through the bipolar plate 2, such as for cooling the electrochemically active region 18 of the separator plate 2. The coolant thus serves primarily to cool the electrochemically active region 18 of the separator plate 2. The coolant flows through the cavity 19 from an inlet opening 11a towards an outlet opening 11a. Mixtures of water and antifreeze are often used as coolants. However, other coolants are also conceivable. For guidance of the coolant or cooling medium, channel structures are present on the inner side of the separator plate 2. These are not visible in FIG. 2 since they extend, for example, on the surface of the individual plate 2a facing away from the viewer; they are therefore situated opposite the above-mentioned channel structures 14 on the other surface of the individual plate 2a. In the active region 18, the channel structures guide the cooling medium along the inner side of the separator plate towards the outlet opening 11a.

Figure 4:
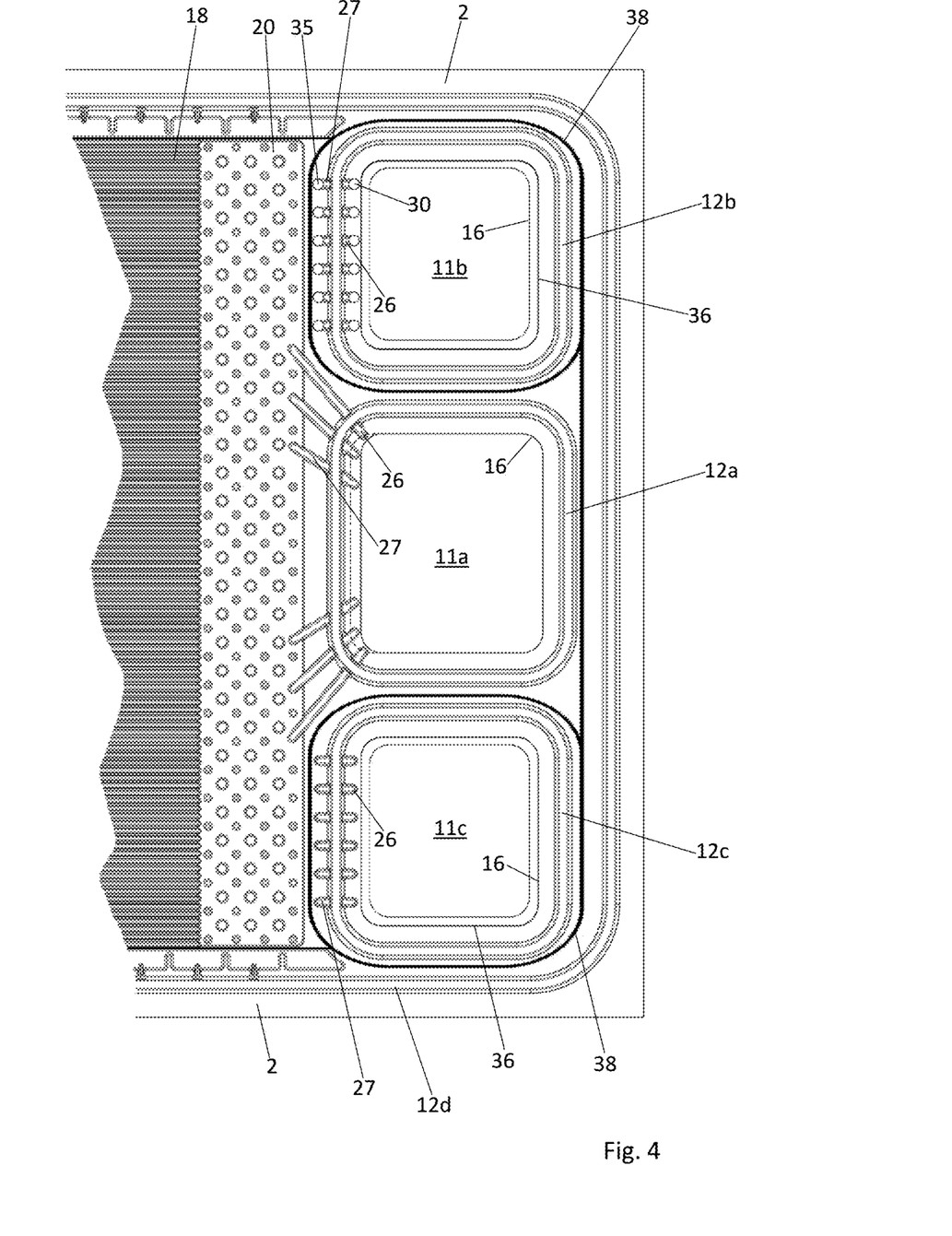
FIG. 4 shows a sub-region of a separator plate according to one embodiment, in a plan view.

While FIG. 2 shows a separator plate in which the perimeter bead does not enclose the through-openings 11a, e.g. the perimeter bead is crossed by conveying channels 13a, designs of separator plates are also possible in which the through-openings 11a are enclosed by the perimeter bead in the same way as the other through-openings 11b, 11c, so that no such crossing is necessary, cf. FIG. 4.

Figure 3A:
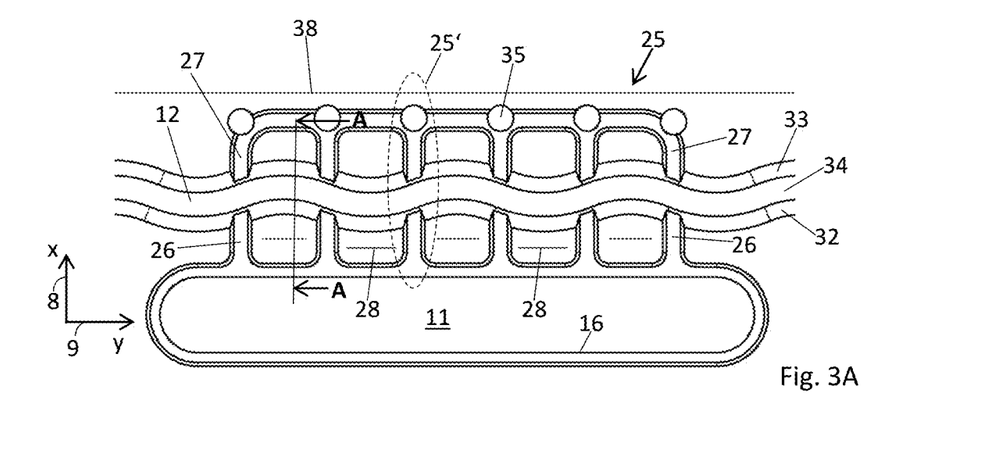
FIG. 3A shows a group of bead passages of a separator plate according to the prior art, in a plan view.
Figure 3B:
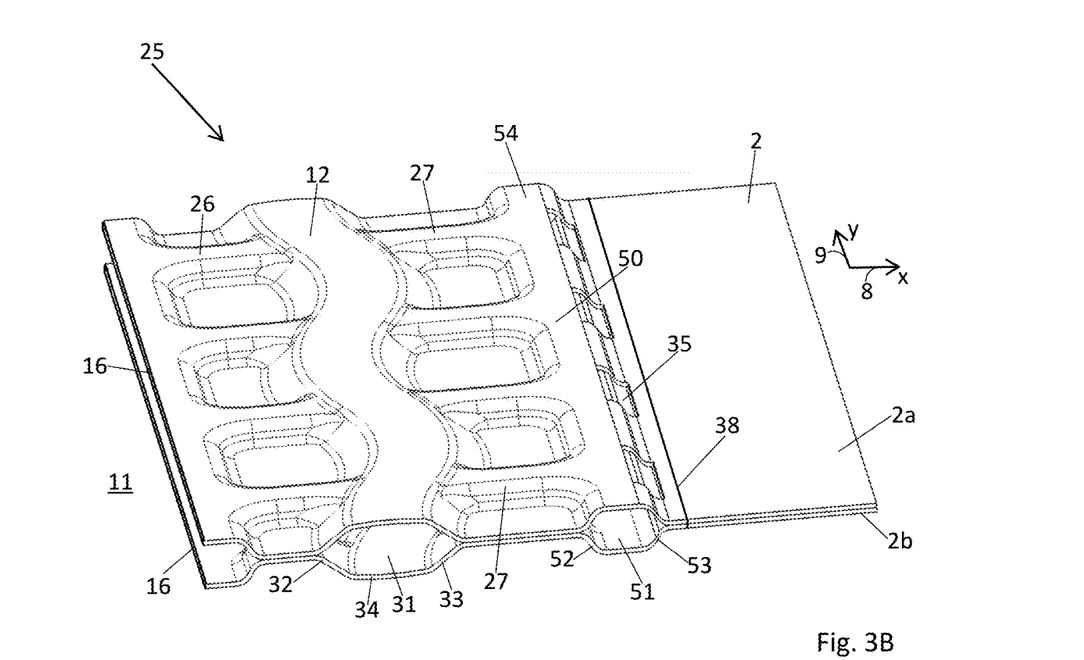
FIG. 3B shows a perspective view of another group of bead passages of a separator plate according to the prior art, in a non-compressed state of the separator plate.
Figure 3C:
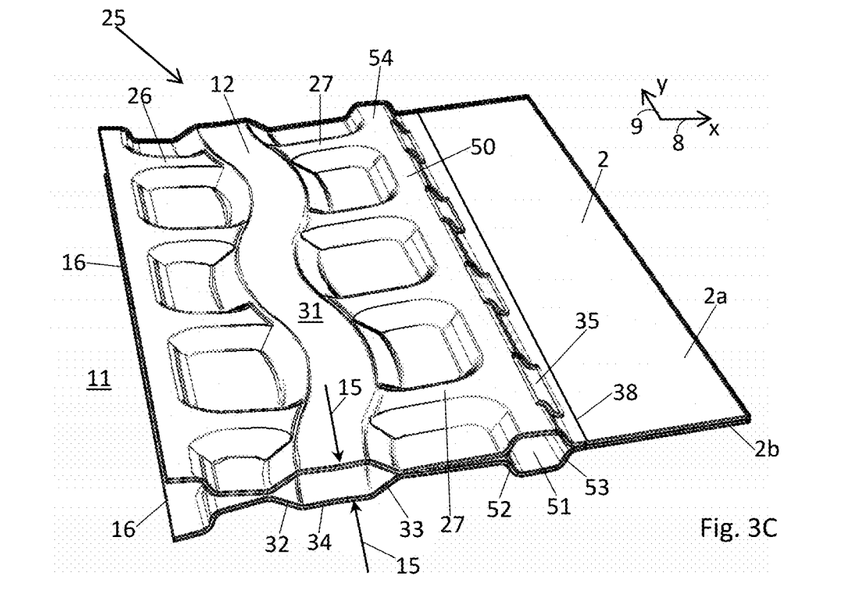
FIG. 3C shows the bead passages of FIG. 3B in a compressed state of the separator plate.
Figure 3D:
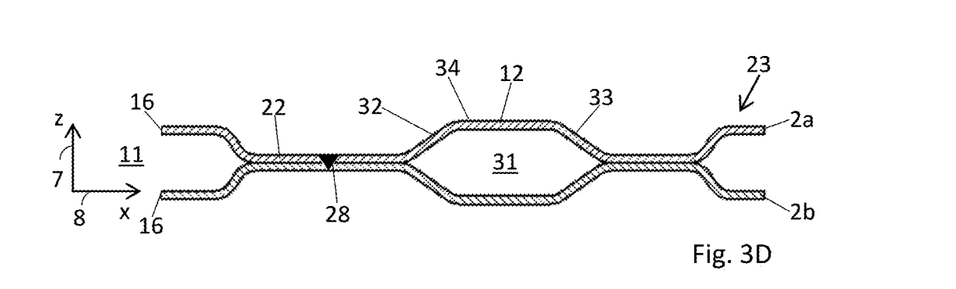
FIG. 3D shows a sectional view between two bead passages of FIG. 3A in a non-compressed state of the separator plate.
Figure 3E:
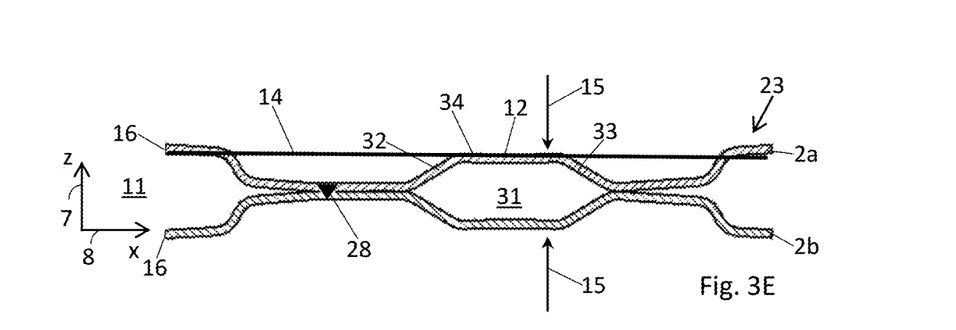
FIG. 3E shows a sectional view between two bead passages of FIG. 3A in a compressed state of the separator plate.

FIG. 3 comprises sub-FIGS. 3A-3E and shows further separator plates 2 according to the prior art. In the following, the through-opening 11 can represent one of the above-mentioned through-openings 11a-11c. Sub-FIGS. 3B-3C show a first variant of separator plates 2 according to the prior art, while sub-FIGS. 3A, 3D and 3E show a second variant likewise according to the prior art.

FIG. 3A shows, in a plan view, the region around a through-opening 11 of a separator plate 2 with conventional bead passages 25 not according to the present disclosure. For instance, each bead passage 25 shown in FIG. 3A has conveying channels 26, 27 of constant height and constant width. The supplying of a medium from the through-opening 11, through the sealing bead 12, to the electrochemically active region 18 of the separator plate 2 can take place in a targeted manner with the aid of such conveying channels 26, 27. Such embodiments of conveying channels 26, 27 can also improve the discharging of the medium from the electrochemically active region 18, through the bead arrangement 12, to the through-opening 11.

FIGS. 3B, 3C each show, in a perspective view, a portion of a separator plate that is slightly varied in comparison to FIG. 3A. FIG. 3C shows the portion in the compressed state of the separator plate, wherein a force exerted on the bead arrangement 12 perpendicular to the flat surface plane of the separator plate 2 or perpendicular to the flat surface plane of the individual plates 2a, 2b is marked by arrows 15. The force arises as a result of the separator plates 2 and membrane electrode assembles 10 in the stack 6 being compressed between the end plates 3, 4.

The through-opening 11 of the separator plate 2 is formed by aligned or at least partially overlapping through-openings of the two individual plates 2a, 2b. The through-openings of the individual plates 2a, 2b each have embossed inner edges 16 around the circumference, which point away from each other and are spaced apart from each other. An inlet and/or outlet of a conveying channel 26, which points towards the through-opening 11, is formed on the embossed inner edge 16 of the through-opening, the conveying channel 26 and the embossed inner edge 16 having an equal height, measured perpendicular to a flat surface plane (plate plane) of the separator plate 2.

These embossed inner edges 16, or more specifically the embossed regions that directly adjoin the inner edges 16, are on the one hand advantageous with regard to forming the conveying channels 26 and punching out or cutting the through-openings 11 in one plane. On the other hand, however, the spaced-apart inner edges 16 pose a risk of short-circuits, for instance when the individual plates 2a, 2b diverge even further from each other due to the compression force on the sealing bead 12 in the stack 6 and the associated lever effect on the inner edge 16, as a result of which adjacent separator plates 2 may damage or destroy the reinforcing edge (not shown here) of the MEA and in the worst case may make contact with each other through the resulting openings and thus may form a short-circuit. It can therefore be seen from the diagram in FIG. 3C that, when compressed, the individual plates 2a, 2b diverge away from each other in regions 21, 23 spaced apart from the sealing bead 12, so that the individual plate 2a partially projects beyond the height 24 of the sealing bead 12 in the regions 21, 23. In this case, for example, the membrane electrode assembly 10 arranged between adjacent separator plates of the stack 2, such as the frame-like reinforcing layer, may be damaged.

FIGS. 3D, 3E each show two sectional views between two bead passages 25 according to FIG. 3A, the section plane being perpendicular to the flat surface plane of the separator plate 2. The section plane extends along the straight line A-A marked in FIG. 3A. The diagram in FIG. 3D shows the region adjacent to the bead passage 25 in the non-compressed state of the separator plate 2. The diagram in FIG. 3E shows the region adjacent to the bead passage 25 in the compressed state of the separator plate, comparable to the state in FIG. 3C. In FIGS. 3D and 3E—in a manner differing from FIGS. 3C and 3D—welded joints 28 are formed between the individual plates 2a, 2b of the separator plate 2 in the flat regions 22 of the separator plate 2 arranged between adjacent conveying channels 26, in order to connect the plates 2a, 2b in a materially bonded manner, see also FIG. 3A. As shown in FIGS. 3A-3C, on a side of the sealing bead 12 facing towards the active region 18, a continuous weld line 38 is formed between the two individual plates 2a, 2b of the separator plate 2 in the regions between the conveying channels 27. The disadvantageous lever effect and the divergence of the individual plates 2a, 2b is thus somewhat reduced on a side of the sealing bead facing towards the active region 18 in FIG. 3C than on the side of the sealing bead 12 facing towards the through-opening 11. A comparison between the diagrams of FIGS. 3B to 3E shows that the divergence of the individual plates 2a, 2b in the regions 21, 23 during compression of the bead arrangement 12 can be reduced as a result of the materially bonded connection 28. However, the lever force exerted on the region 21 as a result of the compression of the sealing bead 12 continues to be so great, even in the region 21 on the side of the sealing bead 12 facing towards the through-opening 11, that the individual plate 2a partially projects beyond the height 24 of the bead arrangement 12 in the region 21.

The present disclosure has been designed to solve the problems mentioned above. Various embodiments of the separator plate 2 according to the present disclosure are shown in FIGS. 4-10.

The separator plates 2 of the embodiments in FIGS. 4-10 share the common feature that at least one of the individual plates 2a, 2b has at least one through-opening 11 for the passage of a fluid, with an inner edge 16 bounding the through-opening. A sealing bead 12 arranged around the through-opening 11 is provided for sealing off the through-opening 11, the sealing bead 12 having a sealing bead interior 31, a first bead flank 32 facing towards the through-opening, and a second bead flank 33. A bead top 34 may extend between the bead flanks 32, 33. The bead top 34 may be provided with a coating, for example embodiments including a polymer-based coating may improve the sealing function of the sealing bead 12.

In order to convey the corresponding fluid from the through-opening 11, through the bead 12, to the electrochemically active region 18, or from the electrochemically active region 18, through the bead 12, to the through-opening 11, a group 25 of bead passages 25' is provided. To this end, a plurality of first conveying channels 26 are provided, which adjoin the first bead flank 32 of the sealing bead 12. The first conveying channels 26 are in fluid connection with the sealing bead interior 31, extend from the sealing bead 12 in the direction of the through-opening 11, and are fluidically connected to the through-opening 11 via at least one first aperture 30 formed in the separator plate 2. The through-opening 11 and the sealing bead interior 31 are therefore fluidically connected to each other via the first conveying channels 26 and the at least one first aperture 30. It may be provided that the number of first apertures 30 is equal to the number of first conveying channels 26.

The individual plates 2a, 2b are connected to each other in a materially bonded manner via a first weld 36, wherein the first weld 36 may be designed as a laser weld. The first weld 36 surrounds the through-opening 11 and ensures that the individual plates bear against each other in the edge region of the through-opening 11 and can no longer diverge from each other there.

The first weld 36 is at a smaller distance from the inner edge 16 than the at least one aperture 30 and/or the first conveying channels 26. The respective distance of one element from the next element will be understood here as the smallest distance between the elements. The circumferential first weld 36 is arranged between the inner edge 16 and the aperture 30 and/or the first conveying channels 26 and extends between them.

The individual plates 2a, 2b of the separator plate 2 may be connected to each other in a materially bonded manner at various other points. For example, FIGS. 4-8 show a second weld 38 for connecting the individual plates 2a, 2b. The second weld 38 is arranged at least in part on a side of the sealing bead 12 remote from the through-opening 11 and on a side of the sealing bead 12 facing towards the electrochemically active region 18. The second weld 38 is also arranged around the sealing bead 12 and surrounds the sealing bead 12.

Depending on requirements, the first weld 36 and/or the second weld may be designed as continuous welds or as stitch welds. For instance, the first weld 36 is designed as a stitch weld in FIGS. 5 and 10, whereas it is designed as a continuous weld in FIGS. 4 and 6-8. If reaction media are conveyed through the through-opening 11 (cf. through-openings 11b, 11c), the second weld may be designed as a continuous weld and thus may have a sealing function, so that the cooling fluid flowing in the cavity 19 between the individual plates 2a, 2b does not reach the through-opening 11. When the solution is used for the through-opening 11a, e.g. for the coolant through-opening, the second weld 38 may be designed as a stitch weld; however, it is also possible to provide only individual short welded joints at relatively large intervals, or possibly no second weld 38 at all.

In many embodiments, a plurality of second conveying channels 27 are provided, which adjoin the second bead flank 33 of the sealing bead 12 and are in fluid connection with the sealing bead interior 31. The electrochemically active region 18 and the sealing bead interior 31 are fluidically connected to each other via the second conveying channels 27. It should be noted here that the above-mentioned distribution and/or collection region 20 may optionally still be arranged between the electrochemically active region 18 and the second conveying channels 27. In this case, the fluid connection between the electrochemically active region 18 and the sealing bead interior 31 comprises of the second conveying channels 27 and the distribution and/or collection region 20. Additional connecting sections may sometimes also be provided in the fluid connection.

In some embodiments, the second conveying channels 27 are fluidically connected to the electrochemically active region 18 via at least one second aperture 35 formed in the separator plate 2. Embodiments of through-opening 11 are designed as a through-opening 11b, 11c for reaction media, such as reaction gas. The at least one second aperture 35 is, or the second apertures 35 are, for instance formed in the same individual plate 2a, 2b as the second conveying channels 27. It may be provided that the number of second apertures 35 is equal to the number of second conveying channels 27.

The first and/or second apertures 30, 35 may be designed as cutouts and/or punched holes and can accordingly be formed by cutting and/or punching the plate 2 or the individual plates 2a, 2b.

Figure 5:
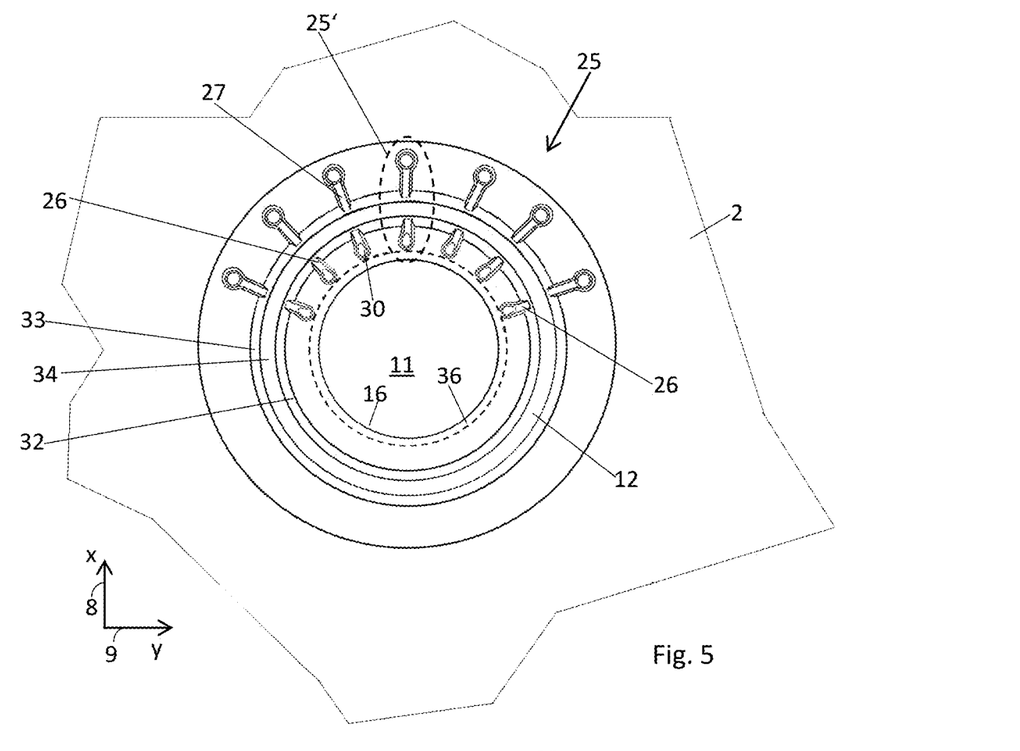
FIG. 5 shows a group of bead passages according to one embodiment, in a plan view.
Figure 7:
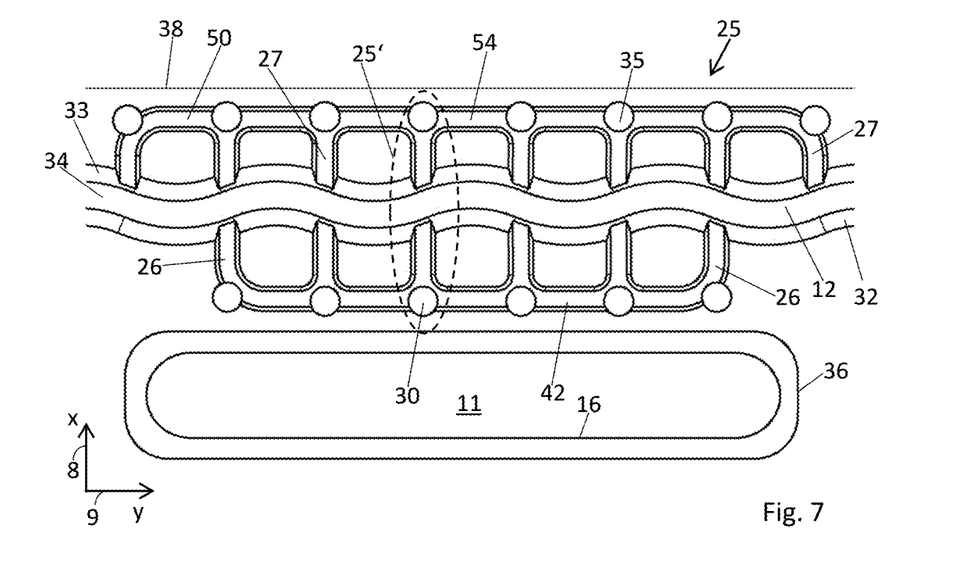
FIG. 7 shows a group of bead passages according to another embodiment, in a plan view.
Figure 8:
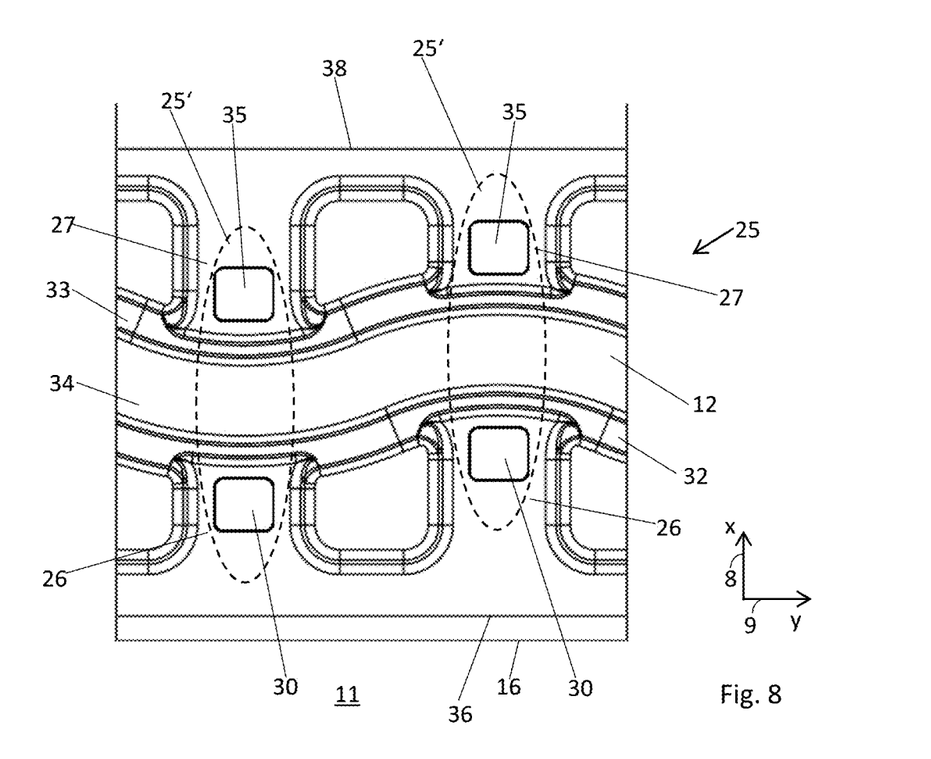
FIG. 8 shows a group of bead passages according to another embodiment, in a plan view.

In the embodiments of FIGS. 4, 5 and 8, the apertures 30, 35 coincide with inlets and outlets of the conveying channels 26, 27. The separator plates 2 in the embodiments of FIGS. 6, 7, 9 and 10 have at least one auxiliary bead 40, 50, which is fluidically connected to the conveying channels 26, 27. As a result, the apertures 30, 35 are spaced apart from the conveying channels 26, 27.

The first auxiliary bead 40 usually has a first auxiliary bead interior 41, a first auxiliary bead flank 42 facing towards the through-opening 11, and a second auxiliary bead flank 43 facing towards the sealing bead 12, wherein the first conveying channels 26 adjoin the second bead flank 43 of the first auxiliary bead 40 and are in fluid connection with the first auxiliary bead interior 41. The first conveying channels 26 extend from the first auxiliary bead 40 to the sealing bead 12, more specifically from the second bead flank 43 of the first auxiliary bead 40 to the first bead flank 32 of the sealing bead 12. The bead flanks 42, 43 are connected to each other by a bead top 44. In addition, the first auxiliary bead 40 is designed as a full bead.

A maximum height of the first auxiliary bead 40, determined perpendicular to a flat surface plane of the separator plate 2, is typically smaller than a corresponding maximum height of the sealing bead 12. Unlike the sealing bead 12, the first auxiliary bead 40 is usually not compressed in the compressed state of the separator plate 2.

Figure 6:
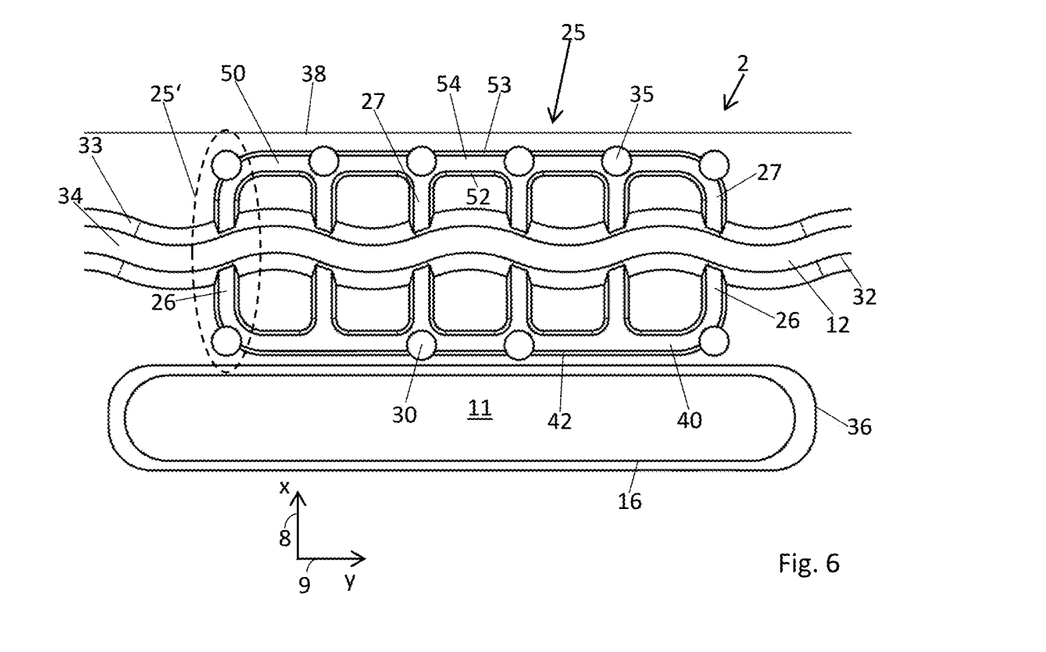
FIG. 6 shows a group of bead passages according to another embodiment, in a plan view.

In some embodiments, the first auxiliary bead 40 extends all the way around the through-opening 11. In other embodiments, the first auxiliary bead 40 is provided only in a region where the first conveying channels 26 are provided, cf. FIGS. 6-7. If the first auxiliary bead 40 is provided, the number of first apertures 30 may be less than, equal to or greater than the number of first conveying channels 26, as shown in FIG. 6. Like the first conveying channels 26, the first auxiliary bead 40 extends so as to be spaced from the inner edge 16.

The second auxiliary bead 50 usually comprises a second auxiliary bead interior 51, a first bead flank 52 facing towards the sealing bead 12, and a second bead flank 53 facing away from the sealing bead 12, wherein the second conveying channels 27 adjoin the first bead flank 52 of the second auxiliary bead 50 and are in fluid connection with the second auxiliary bead interior 51. The second conveying channels 27 extend from the second auxiliary bead 50 to the sealing bead 12, more specifically from the first bead flank 52 of the second auxiliary bead 50 to the second bead flank 33 of the sealing bead 12. The bead flanks 52, 53 are connected to each other by a bead top 54. In addition, the second auxiliary bead 50 is designed as a full bead.

A maximum height of the second auxiliary bead 50, determined perpendicular to a flat surface plane of the separator plate 2, is typically smaller than a corresponding maximum height of the sealing bead 12. Unlike the sealing bead 12, the first auxiliary bead 50 is usually not compressed in the compressed state of the separator plate 2.

Embodiments of second auxiliary bead 50 are usually provided only in a region in which the second conveying channels 27 are arranged, cf. FIGS. 6-7. This region usually extends between the conveying channels 27 and the flow field 17 or the electrochemically active region 18 or the distribution and collection region 20. If the second auxiliary bead 50 is provided, the number of second apertures 35 may be less than, equal to or greater than the number of second conveying channels 27. The second weld 28 is usually arranged on a side of the second auxiliary bead 50 remote from the sealing bead 12.

Uniformity of the area surrounding the sealing bead 12 increases the possibility that the compression force on the sealing bead 12 and the area around the latter in the stack 6 is as homogeneous as possible. For this reason, it is advantageous if both the first auxiliary bead and the second auxiliary bead 50 are provided. For the same reason, the two auxiliary beads 40, 50 may have the same height. In addition, the auxiliary beads 40, 50 and their associated conveying channels 26, 27 may have the same height, measured perpendicular to a plate plane of the separator plate 2. On the other hand, it is also possible for the heights of, for example, the auxiliary beads 40, 50 and optionally also the conveying channels 26, 27 on both sides of the sealing bead to be different, so as to optimize the relative compression; by way of example, the auxiliary bead 40 may have a height that lies between the height of the auxiliary bead 50 and the height of the sealing bead 12. The adjoining conveying channels can in this case be set to the height of the adjacent auxiliary bead or may have the same height as each other.

In the embodiments in which the two auxiliary beads 40, 50 are provided, the inlets and outlets of the conveying channels 26, 27 are located in the bead flanks 43, 52 of the auxiliary beads 40, 50 and are therefore spaced apart from the apertures 30, 35.

The auxiliary beads 40, 50 optionally extend parallel to each other. Furthermore, the first auxiliary bead 40, the second auxiliary bead 50, the inner edge 16 of the through-opening 11 and/or a main direction of extension of the sealing bead 12 may extend at least in part in a parallel manner. The conveying channels 26, 27 are optionally oriented at an angle to the first weld 36, to the second weld 38, to the first auxiliary bead 40, to the second auxiliary bead 50 and/or to the main direction of extension of the sealing bead 12, such as at an angle of at least 60° and/or at most 120°, for instance around 90°. The selected angle may depend on the space available.

The sealing bead 12, the conveying channels 26, 27 and the auxiliary beads 40, 50 are usually integrally formed in the respective individual plate 2a, 2b, for example by embossing, hydroforming or deep-drawing. The sealing bead 12, the conveying channels 26, 27 and the auxiliary beads 40, 50 are thus an integral part of the respective separator plate 2a, 2b.

The through-opening 11 may have different shapes, for example square with rounded corners (FIG. 4), round (FIG. 5) or slot-shaped (FIGS. 6-7); more complex shapes are also possible. The sealing bead 12 may have at least in part a wavy, curved, round or straight course. The course of the sealing bead 12 usually depends on the shape of the through-opening 11. For instance, the sealing bead 12 in the embodiment of FIG. 4 has four straight sections, which are connected to each other by curved sections. The sealing bead in the embodiment of FIG. 5 extends in a circular fashion around the likewise circular through-opening 11. The sealing beads 12 in FIGS. 6-10 each have a wavy course. The wavy sealing bead 12 has alternating concave sections and convex sections, which in each case merge into each other at a turning point. A main direction of extension of the sealing bead 12 then results from the line connecting the turning points of the neutral fiber of the sealing bead 12. The main direction of extension of the sealing bead 12 may extend at least in part parallel to the first auxiliary bead 40, the second auxiliary bead 50 and the inner edge 16, cf. FIGS. 6-10.

In the embodiments of FIGS. 6, 7, 9 and 10, the conveying channels 26, 27 are arranged at the turning points of the wavy course of the sealing bead 12 or adjoin the turning points. Alternatively, the conveying channels 26, 27 may be arranged alternately at the convex and/or the concave sections of the wavy shape, cf. embodiment of FIG. 8.

The group 25 of bead passages 25' in FIG. 7 differs from the bead passages of FIG. 6 in that the number of second conveying channels 27 is greater than the number of first conveying channels 26. This may be advantageous, for example, if the fluid has to be distributed and/or collected over a relatively large distribution and/or collection region 20.

The first apertures 30 of the separator plates of FIGS. 4-9 are spaced apart from the inner edge 16, and the first weld 36 is located in the region between the inner edge 16 and the first apertures 30. The first weld 36 is thus at a smaller distance from the inner edge 16 than the first apertures 30 and the first conveying channels 26. The first conveying channels 26 are spaced from the inner edge 16.

Figure 9A:
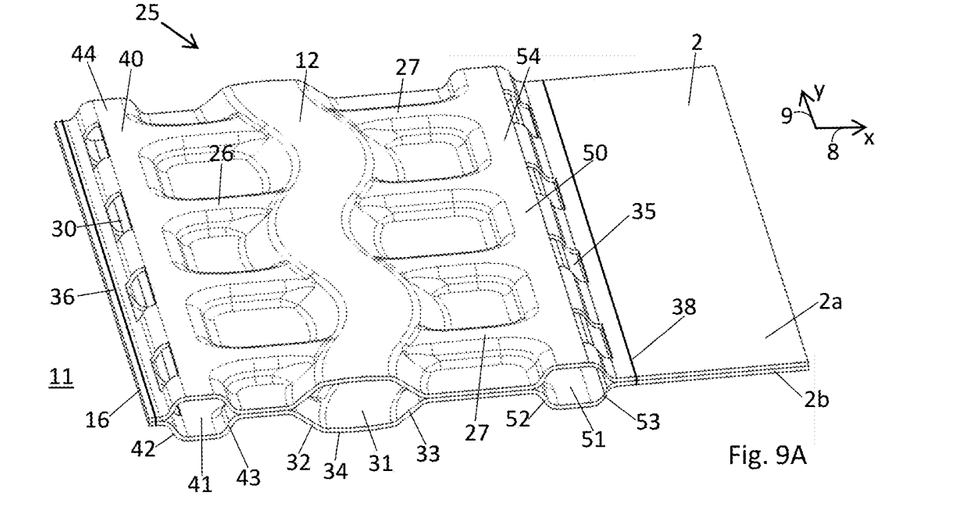
FIG. 9A shows a perspective view of a group of bead passages according to another embodiment, in a non-compressed state of the separator plate.
Figure 9B:
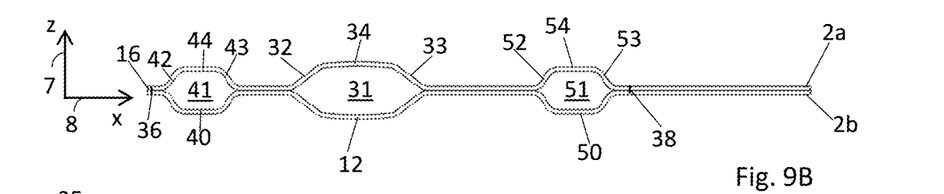
FIG. 9B shows a sectional view between two bead passages of FIG. 9A.
Figure 9C:
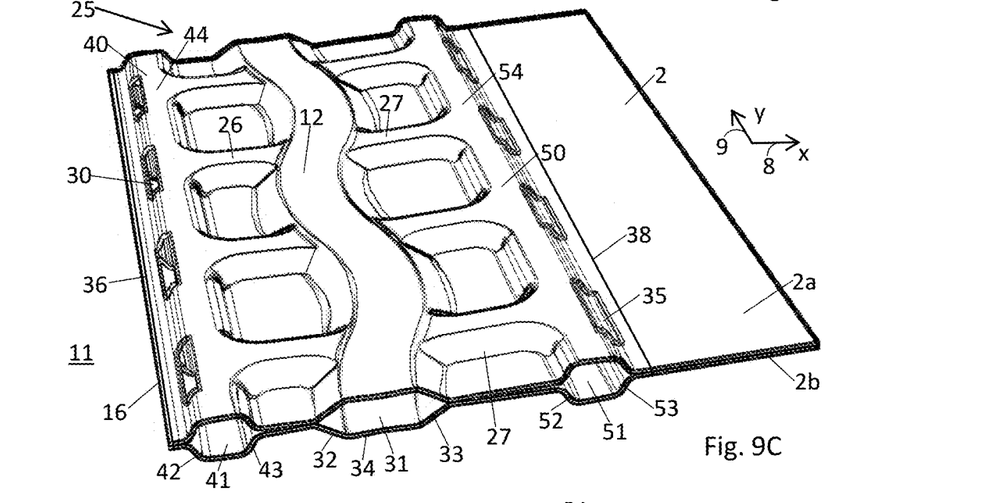
FIG. 9C shows the group of bead passages of FIG. 9A in a compressed state of the separator plate.
Figure 9D:
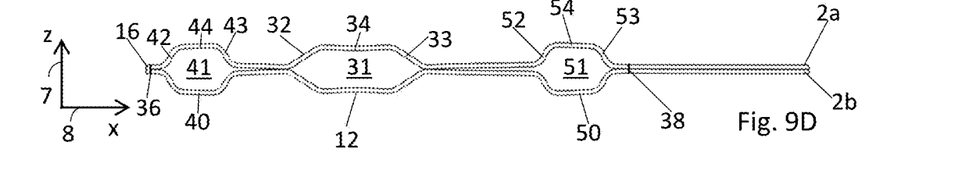
FIG. 9D shows a sectional view between two bead passages of FIG. 9C.

FIG. 9A shows a group 25 of bead passages 25' in a plan view, with FIG. 9B showing a sectional view between the bead passages 25' of FIG. 9A. The group 25 of bead passages 25' in FIGS. 9A, 9B is shown in a non-compressed state of the separator plate 2. FIGS. 9C and 9D also show the same group 25 of bead passages 25' from FIGS. 9A and 9B, but in a compressed state of the separator plate 2. A comparison of the separator plate of FIGS. 9A-D with the separator plate 2 of FIGS. 3B-3C shows that the individual plates 2a, 2b in FIGS. 9A-D bear against each other in the region of their inner edges 16 and are fixedly connected to each other in a materially bonded manner by the first weld 36. As a result, the inner edges 16 of the individual plates 2a, 2b pose no risk of short-circuits in the compressed state of the separator plate 2.

Figure 10:
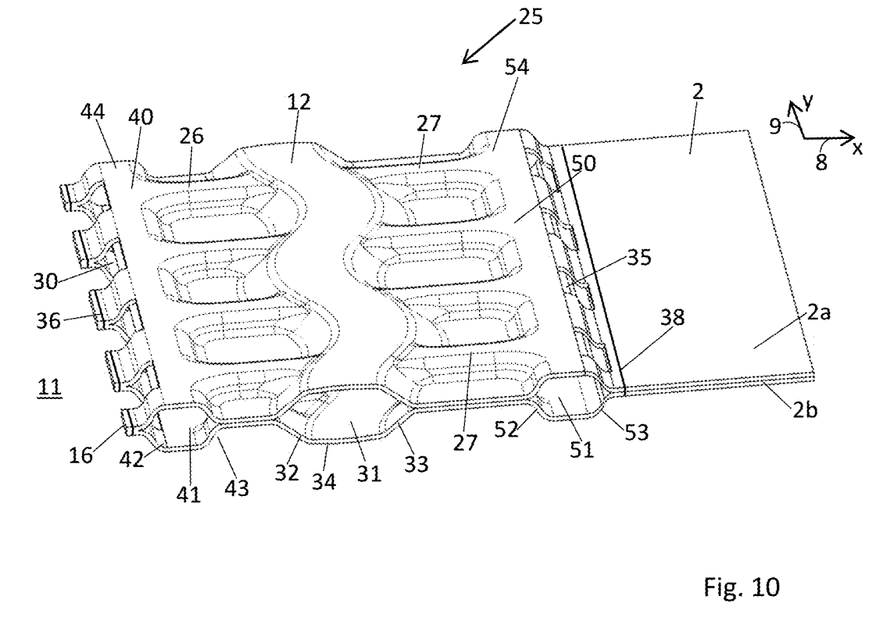
FIG. 10 shows a perspective view of a group of bead passages according to another embodiment.

The separator plate 2 of FIG. 10 differs from the separator plate of FIG. 9 in that the first apertures 30 are designed as cutouts in the plate 2, which extend from the bead flank 42 or the bead top 40 to the inner edge 16. As a result, embodiments of the first weld 36 are designed as a stitch weld and is provided only in sections where there are no apertures 30. The first weld 36 is at a smaller distance from the inner edge 16 than the first conveying channels 26.

FIGS. 1-10 are shown approximately to scale. FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first,"

"second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" or "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A separator plate for an electrochemical system, comprising a first individual plate and a second individual plate, which are connected to each other, wherein at least the first individual plate comprises:
    an electrochemically active region,
    at least one through-opening for the passage of a fluid, having an inner edge that bounds the through-opening,
    a sealing bead arranged around the through-opening for sealing off the through-opening, wherein the sealing bead has a sealing bead interior, a first bead flank facing towards the through-opening, and a second bead flank,
    a plurality of first conveying channels, which adjoin the first bead flank of the sealing bead, are in fluid connection with the sealing bead interior, extend from the sealing bead in the direction of the through-opening, and are fluidically connected to the through-opening via at least one first aperture formed in the separator plate, wherein the through-opening and the sealing bead interior are fluidically connected to each other via the first conveying channels and the at least one first aperture,
    a first weld, surrounding the through-opening, for connecting the two individual plates, wherein the first weld is at a smaller distance from the inner edge than the at least one aperture and/or the first conveying channels, and
    a first auxiliary bead having a first auxiliary bead interior, a first auxiliary bead flank facing towards the through-opening, and a second auxiliary bead flank facing towards the sealing bead, wherein the first conveying channels adjoin the second auxiliary bead flank of the first auxiliary bead and are in fluid connection with the first auxiliary bead interior.

2. The separator plate according to claim 1, further comprising a second weld for connecting the individual plates, said second weld arranged around the sealing bead on a side of the sealing bead remote from the through-opening.

3. The separator plate according to claim 2, wherein the first weld and/or the second weld are continuous welds or stitch welds.

4. The separator plate according to claim 1, wherein a maximum height of the first auxiliary bead, determined perpendicular to a flat surface plane of the separator plate, is smaller than a corresponding maximum height of the sealing bead.

5. The separator plate according to claim 1, wherein the first auxiliary bead extends all the way around the through-opening, or wherein the first auxiliary bead is provided only in a region in which the first conveying channels are arranged.

6. The separator plate according to claim 1, wherein the first auxiliary bead and the inner edge of the through-opening extend at least in part parallel to each other.

7. The separator plate according to claim 1, comprising a plurality of second conveying channels, which adjoin the second bead flank of the sealing bead and are in fluid connection with the sealing bead interior, wherein the electrochemically active region and the sealing bead interior are fluidically connected to each other via the second conveying channels.

8. The separator plate according to claim 7, wherein the second conveying channels are fluidically connected to the electrochemically active region via at least one second aperture formed in the separator plate.

9. The separator plate according to claim 7, comprising a second auxiliary bead having a second auxiliary bead interior, a first bead flank facing towards the sealing bead, and a second bead flank facing away from the sealing bead, wherein the second conveying channels adjoin the first bead flank of the second auxiliary bead and are in fluid connection with the second auxiliary bead interior.

10. The separator plate according to claim 1, wherein the first bead flank of the sealing bead comprises an inner surface adjacent to the sealing bead interior and an outer surface opposite the inner surface, and wherein each of the plurality of first conveying channels comprise a surface extending from the outer surface of the first bead flank of the sealing bead in a direction towards the through-opening and away from the sealing bead interior.

11. The separator plate according to claim 1, wherein the second auxiliary bead flank of the first auxiliary bead comprises an inner surface adjacent to the first auxiliary bead interior and an outer surface opposite the inner surface, and wherein each of the plurality of first conveying channels comprise a surface extending from the outer surface of the second auxiliary bead flank of the first auxiliary bead in a direction towards the sealing bead and away from the first auxiliary bead interior.

12. The separator plate according to claim 9, wherein the first bead flank of the second auxiliary bead comprises an inner surface adjacent to the second auxiliary bead interior and an outer surface opposite the inner surface, and wherein each of the plurality of second conveying channels comprise a surface extending from the outer surface of the first bead flank of the second auxiliary bead in a direction towards the sealing bead and away from the second auxiliary bead interior.

* * * * *